United States Patent

[11] 3,608,571

| [72] | Inventor | Richard L. Wilcox |
| | | Adel, Iowa |
| [21] | Appl. No. | 822,426 |
| [22] | Filed | May 7, 1969 |
| [45] | Patented | Sept. 28, 1971 |
| [73] | Assignee | Delavan Manufacturing Company |

[54] FLUIDIC FLOW CONTROL VALVE
10 Claims, 6 Drawing Figs.

| [52] | U.S. Cl. | 137/81.5 |
| [51] | Int. Cl. | F15c 1/16 |
| [50] | Field of Search | 137/81.5 |

[56] References Cited
UNITED STATES PATENTS

| 3,513,865 | 5/1970 | Van Der Heyden | 137/81.5 |
| 3,519,008 | 7/1970 | Fish | 137/81.5 |
| 3,520,317 | 7/1970 | Goldschmied | 137/81.5 |
| 3,521,657 | 7/1970 | Ayers | 137/81.5 |
| 3,195,303 | 7/1965 | Widell | 137/81.5 X |
| 3,267,946 | 8/1966 | Adams et al. | 137/81.5 |
| 3,276,259 | 10/1966 | Bowles et al. | 137/81.5 X |
| 3,335,737 | 8/1967 | Gesell | 137/81.5 |
| 3,410,287 | 11/1968 | Heyden et al. | 137/81.5 X |
| 3,417,772 | 12/1968 | Schaeffer | 137/81.5 |
| 3,426,534 | 2/1969 | Murphy | 137/81.5 X |
| 3,452,767 | 7/1969 | Posingies | 137/81.5 |
| 3,489,009 | 1/1970 | Rimmer | 137/81.5X |
| 3,504,688 | 4/1970 | Jones | 137/81.5 |

Primary Examiner—Samuel Scott
Attorney—Molinare, Allegretti, Newitt & Witcoff

ABSTRACT: A fluidic flow control valve having a control fluid passage which communicates tangentially with a vortex chamber to form a control fluid vortex in the chamber, a power fluid inlet passage communicating radially with the chamber, and a discharge passage communicating with the chamber for discharging the control and power fluids therefrom. A plurality of resistor plates having vortex chambers therein are positioned upstream of the chamber and form fixed resistors in the control fluid stream.

PATENTED SEP 28 1971
3,608,571
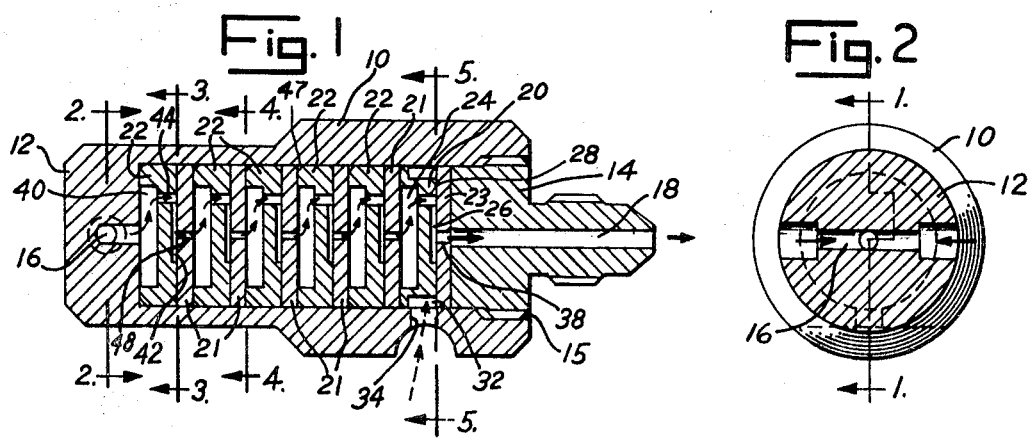
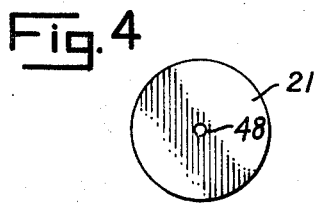
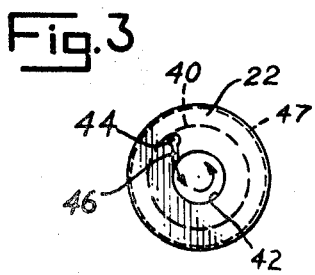
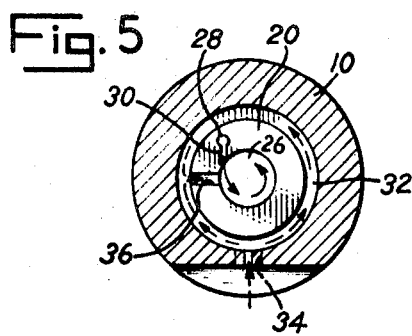
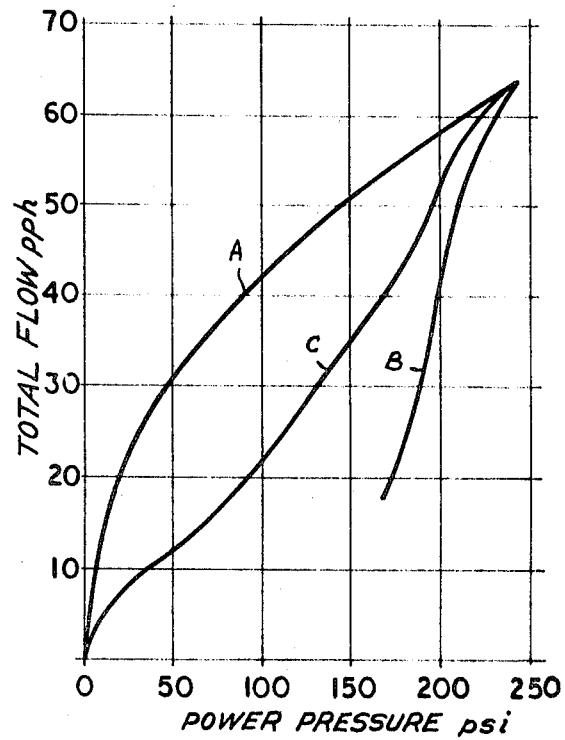
INVENTOR.
RICHARD L. WILCOX
BY
Bair, Freeman &
Molinare ATTORNEYS

FLUIDIC FLOW CONTROL VALVE

BACKGROUND OF THE INVENTION

This invention relates to fluidic flow control valves and, more particularly, to fluidic control devices of the vortex-type for controlling the discharge rate of a fluid.

Fluidic flow control devices have been proposed in the past regulating the discharge flow rate of various fluid streams, such devices having the advantage of providing flow rate control without moving parts. One form of system in which fluidic flow rate control may be particularly advantageous is in the control of the flow rate of fuel to combustion engines. In such engines, it is desirable that the flow rate be regulated in the simplest possible manner and that the flow pressure curve over the range of operation of the engine be such as to provide for uniform engine operation over a wide range of speeds.

The fluidic valve of my invention has the ability of controlling the flow rate of a fluid with extreme accuracy, and yet has no moving parts and is simple to manufacture. The fluidic device of my invention is capable of achieving accurate flow rate control at extremely low flow rates without the necessity of employing small passages which might be subjected to plugging by contaminants. In addition, the flow control device of my invention is capable of achieving an excellent maximum to minimum fluid output ratio with close flow rate control tolerances throughout a wide range of flow rates and also at relatively low maximum pressures, thus substantially reducing the weight and cost that would be required if high pressure pumps and lines must be employed. Finally, the flow control device of my invention is both simple and inexpensive to manufacture and produces a substantially less curvilinear more readily controlled flow-pressure curve than control orifice devices and the like.

SUMMARY OF THE INVENTION

In a principal aspect, the fluidic control device constructed in accordance with the principles of my invention includes a body having a cylindrical chamber defined therein, a power fluid inlet passage communicating with the chamber, a control fluid inlet passage communicating tangentially with the chamber, and a discharge passage communicating with the chamber for discharging the control and power fluids therefrom. A fixed resistance means is provided in the control fluid inlet passage for increasing the resistance of the control fluid stream.

These and other objects, features and advantages of the present invention will be more clearly understood through a consideration of the following detailed description.

BRIEF DESCRIPTION OF THE DRAWING

In the course of this description reference will frequently be made to the attached drawing in which:

FIG. 1 is a cross-sectioned side elevation view of a preferred embodiment of fluidic flow control valve constructed in accordance with the principles of my invention and taken substantially along line 1—1 of FIG. 2;

FIG. 2 is a cross-sectioned end elevation view of the valve taken substantially along line 2—2 of FIG. 1;

FIG. 3 is an end elevation view of a preferred embodiment of a resistor plate constructed in accordance with the principles of my invention and taken substantially along line 3—3 of FIG. 1;

FIG. 4 is an end elevation view of a preferred embodiment of a separator plate and taken substantially along line 4—4 of FIG. 1;

FIG. 5 is a cross-sectioned end elevation view of the valve taken substantially along line 5—5 of FIG. 1; and FIG. 6 is a plot showing the relationship of the pressure of the power fluid to the total flow rate wherein power flow only is passed through the fluidic valve, in which power and unrestricted control flow is passed through the valve, and in which power flow and control flow which has been subjected to the resistors of my invention is passed through the valve.

DESCRIPTION OF THE PREFERRED EMBODIMENT

In the drawing, a preferred embodiment of fluidic flow control valve of my invention is shown which comprises a generally tubular hollow body member 10 which is elongated and cylindrical in form. The body member 10 is closed at one end by an integrally formed one-piece end plug 12 and at the other end by a discharge plug 14 which is inserted into the body and welded in place at 15. A control fluid passage 16 is bored in end 12 and opens to the interior of the body and a discharge passage 18 is axially bored through the discharge plug 14. A plurality of plates 20, 21, 22 and 23 of flat cylindrical form are firmly positioned in series face-to-face relationship between the end 12 and the discharge plug 14.

As shown particularly in FIGS. 1 and 5, plate 20 has a relatively large cylindrical recess 24 formed in one face thereof and a smaller cylindrical recess 26, which forms a vortex chamber, in the other face thereof, each of the recesses being substantially shallower in depth than the thickness of the plate. A passage 28 is bored through the thickness of the plate and into larger recess 24. A slotted passage 30 is cut at an angle to passage 28 into the face of the plate having recess 26 and communicates at one end with passage 28 at the other end tangentially with recess 26 for the purpose to be described in more detail hereafter.

An annular recess 32 is formed about the periphery of the plate, toward the right face of the plate as viewed in FIG. 1, which cooperates with the interior wall of the body member 10 to form a power fluid passage extending about the plate and which communicates with a power fluid inlet 34 in the body. A passage 36 is bored between the annular passage 32 and opens radially into the recess 26, as shown in FIG. 5.

A flat separator plate 23 is positioned between plate 20 and the inner end of discharge plug 14 and includes a substantially central bore 38 which communicates with the center of recess 26 and the discharge passage 18.

One or more resistor plates 22 are provided between plate 20 and the control fluid inlet passage 16. Referring to FIGS. 1 and 3 in particular, each of the resistor plates 22 is also of generally flat cylindrical form and each includes a larger cylindrical recess 40 in one face thereof and a smaller recess 42 in the other face. Again, each of the recesses is substantially shallower in depth than the thickness of the resistor plate. As in plate 20, a passage 44 is bored through the thickness of plate 22 into larger recess 40 and a slotted passage 46 communicates at one end with passage 44 and tangentially at the other end with the smaller of the recesses. Both plates 20 and 22 may be chamfered on one side at 47 as shown.

Each of the resistor plates 22 is separated from each other and from plate 20 by flat circular separator plate 21 having passages 48 centrally bored therein which communicate between the center of the smaller recess 42 of one resistor plate with the larger recess 40 in the next plate. The passages 48 in plates 21 may be somewhat smaller than bore 38 in plate 23 since only control fluid passes through the former passages.

In operation, power fluid is introduced through inlet passage 34 into the annular passage 32 and passes therefrom through radial passage 36 into the smaller recess 26 of plate 20 as shown by the dotted arrows in the drawing. The power fluid then passes through bore 38 in plate 23 and through the discharge passage 18. The power fluid may be, by way of example, liquid fuel which is to be introduced into a combustion engine. If the pressure of the power fluid is varied, the total flow rate of the fluid which is discharged through the discharge passage 18 will also vary as shown in curve A of FIG. 6. Curve A shows the pressure of the power fluid to total flow rate relationship where power fluid only is introduced into the fluidic valve in the absence of control fluid.

Referring to curve B in FIG. 6, the power pressure relationship to total flow rate is shown where control fluid is also introduced tangentially through passage 30 into the recess 26 in addition to the power fluid which enters through passage 36. Curve B is exemplary of the pressure of the power fluid to total flow relationship where the pressure of the control fluid is maintained constant at approximately 200 p.s.i. When the control fluid is tangentially introduced into the recess 26, a vortex of control fluid is created in the recess. It will be seen when viewing curve B in FIG. 6, that the presence of the control fluid vortex substantially alters the total flow realized from the discharge passage 18 for any given pressure of power fluid with respect to that which is realized where the control flow is absent. In fact it will be seen that even though the additional control fluid stream is being introduced into recess 26, the total flow output is actually less in the case of curve B than it is in curve A where the control stream is not present. It will be understood that the control flow may be the same fluid which comprises the power flow.

It has been found that if resistors are provided in the control flow stream to set up a resistance in the control fluid, the power pressure to total flow rate relationship may be further substantially altered from either the relationship shown in curve A or curve B and may be altered to provide a substantially more ideal linear power pressure to flow rate relationship which may be more easily controlled.

By way of example, the pressure of the power fluid to total flow relationship, as altered by one or more of the resistors 22, is shown in curve C of FIG. 6 in which the control pressure is again maintained constant at 200 P.s.i. as in curve B. It will be seen when considering curve C that the change in total output flow is substantially more gradual for a given change in power pressure than the total flow change in curve B. Accordingly the total flow output is more easily controlled by variably adjusting the power pressure than in curve B. Moreover, curve C is more nearly linear than the conventional orifice square root curve of curve A.

In the preferred form, each of the resistors 22 provides a fixed resistance by forming a vortex in the control fluid at each resistor as the fluid passes through the resistors on its way to plate 20 due to the tangential entry of passage 46 into each of the recesses 42 of the resistor plates. The whirling fluid then passes through the somewhat restricted orifice 48 in each of the separator plates 21 en route to the next plate. In operation the fluid enters the larger recess 40 of plate 22 from inlet passage 16, passes through passage 44 and through the tangential passage 46 to tangentially enter the smaller recess 42 where the whirling motion is set up. The fluid then passes through the bore 48 in separator plate 21 and enters the larger recess 40 of the next adjacent plate 22, and so on until the fluid reaches the larger recess 24 of plate 20. The control fluid then passes through passage 28 and tangential passage 30 into the vortex recess or chamber 26 of plate 20. In this chamber the whirling control fluid and the power fluid, which is introduced through inlet 34, annular passage 32 and radial passage 36, mix and ultimately pass together through the discharge passage 18 to form the total flow output of the valve.

It will be appreciated that the pressure of either one or both of the power and control fluids may be varied to vary the total flow output through discharge passage 18. Where the fuel flow to an engine is to be controlled, it is preferred that the control flow be maintained at a constant pressure and the power flow pressure be varied to control the total flow output. Such arrangement greatly simplifies the control operation as well as simplifies and reduces the cost of the system and is readily capable of accurate and sensitive control over a wide range of operating conditions due to the excellent power pressure to total flow rate relationship provided by the fluidic valve of my invention.

It will also be appreciated that the resistors of my invention avoid the use of small passages or orifices which might be subject to plugging during use by contaminants in the fluid.

It will be readily understood that although the fluidic flow control valve of my invention has been described in terms of controlling the flow rate of liquid fuels, the valve incorporating the principles of my invention may be employed for the control of other liquids as well as gases. It will also be understood that the number of resistor plates may be increased or decreased as desired to vary the slope of curve C as shown in FIG. 6.

It should be understood that the embodiment of the present invention which has been described is merely illustrative of an application of the principles of the invention. Numerous modifications may be made by those skill in the art without departing from the true spirit and scope of the invention.

What is claimed is:

1. A fluidic flow control device comprising:
 a body having a cylindrical chamber defined therein,
 a power fluid inlet passage communicating with said chamber for introducing a first fluid stream to said chamber,
 a control fluid inlet passage communicating tangentially with said chamber for introducing a second control fluid stream to said chamber,
 a discharge passage communicating with said chamber for discharging the fluid in said first and second fluid streams from the chamber, and
 fixed resistance means in said control fluid inlet passage upstream of said chamber for increasing the resistance of said second control fluid stream, said fixed resistance means including vortex forming means for forming a vortex in said control fluid upstream of said chamber.

2. The control device of claim 1 wherein said power fluid inlet passage extends radially into said chamber and said discharge passage extends from said chamber in a direction parallel to the axis of the chamber.

3. The control device of claim 1 wherein said fixed resistance means controls the resistance of said control fluid such that the flow rate through said discharge passage varies substantially linearly relative to variations in the pressure of said power fluid when the pressure of said control fluid is constant.

4. The control device of claim 1 wherein said fixed resistance means comprises at least one element having an inlet passage communicating tangentially with a second chamber and a control fluid discharge passage communicating with said second chamber and the first mentioned chamber.

5. The control device of claim 4 including a plurality of said resistance elements arranged in series.

6. The control device of claim 4 wherein said first and second chambers are axially aligned.

7. A fluidic flow control device comprising:
 an elongated tubular body having a control fluid inlet adjacent one end thereof,
 a discharge element closing the other end of said tubular body and having a discharge passage extending therethrough,
 a first flat plate axially positioned in said body and having a vortex recess in one face thereof, said vortex recess communicating with said discharge passage,
 a second flat resistor plate axially positioned in said body between said first plate and said control fluid inlet, and having a cylindrical recess in at least one face thereof,
 a tangential passage in each of said plates communicating with said recesses and with said control fluid inlet to form a control fluid vortex in each of said recesses,
 a power fluid inlet means in said body communicating with an annular power fluid passage, and
 a substantially radial passage in said first plate communicating between said annular power fluid passage and said vortex recess, whereby power fluid is introduced into the vortex formed in said vortex recess.

8. The control device of claim 7 including third plate means between said first and second plates and having a passage communicating between the respective recesses of the plates, said passage being substantially smaller in diameter than said recesses.

9. The control device of claim 7 wherein each of said plates includes a second recess in their other faces, and said tangential passages of each plate communicate between their respective recesses.

10. A fluid flow control device comprising:

a body having a cylindrical chamber defined therein,
power fluid inlet means for introducing a power fluid stream to said chamber at a selectively variable pressure,
control fluid means for introducing a control fluid stream at a constant pressure tangentially to said chamber,
discharge means communicating with said chamber for discharging said power and control fluids from the chamber,
said control fluid means including fixed resistance means for fixing the resistance of said constant pressure control fluid such that the flow rate through said discharge means varies in substantially linear relationship with said variable power fluid pressure.